US006015471A

United States Patent [19]

Rimington et al.

[11] Patent Number: 6,015,471

[45] Date of Patent: Jan. 18, 2000

[54] INFLATABLE CUSHIONS

[75] Inventors: Richard Michael Rimington, Powys; Richard Edmond Fletcher, Leominster, both of United Kingdom

[73] Assignee: Manger International Limited, United Kingdom

[21] Appl. No.: 09/070,835

[22] Filed: Apr. 30, 1998

[30] Foreign Application Priority Data

May 15, 1997 [GB] United Kingdom .................. 9709843

[51] Int. Cl.[7] ............................ B29L 22/02; B32B 31/24

[52] U.S. Cl. .................................... 156/274.4; 156/275.1; 156/308.4; 5/654; 5/655.3

[58] Field of Search ............................ 156/273.7, 274.4, 156/275.1, 275.3, 308.4; 5/654, 655.3; 254/93 HP; 219/765

[56] References Cited

U.S. PATENT DOCUMENTS 5,902,011 5/1999 Hand et al. ................................ 5/654

*Primary Examiner*—Michael W. Ball
*Assistant Examiner*—Michael A Tolin
*Attorney, Agent, or Firm*—Neil F. Markva

[57] ABSTRACT

The inflatable lifting cushion comprises two segments (10) each comprising a ring chamber (11) around a central web (12). The two segments (10) are welded together at a junction (13) to define therebetween a central chamber (14). An air inlet fitting (30) (FIG. 1) is attached to one of the segments (10) for simultaneous inflation of the chambers (11) and (14).

6 Claims, 2 Drawing Sheets

FIG. 1
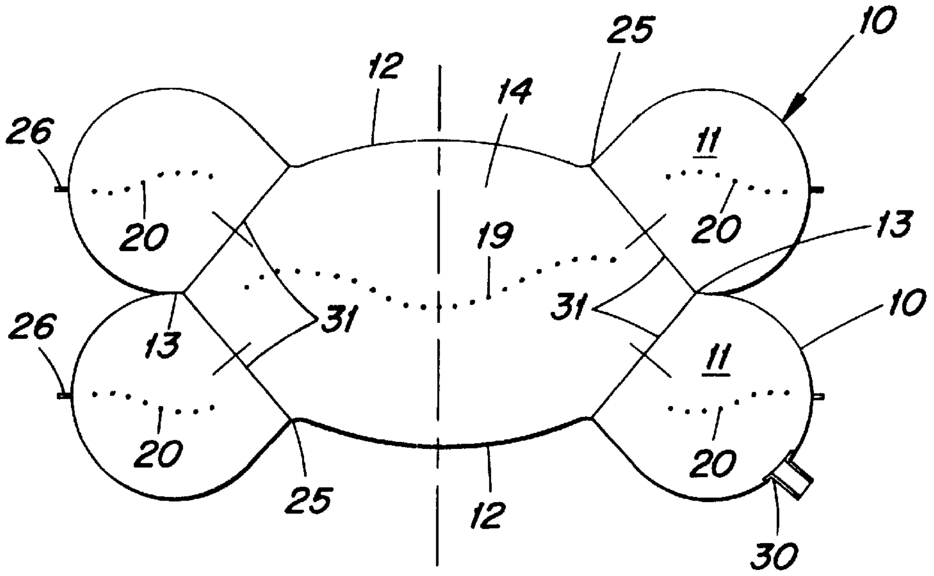
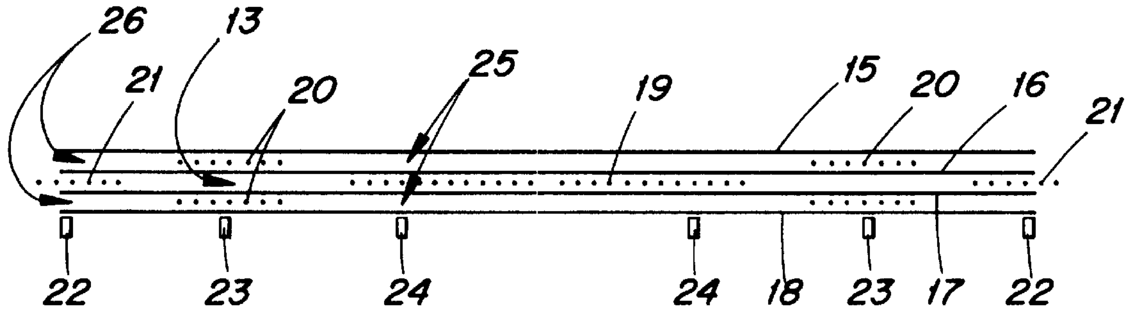
FIG. 3

INFLATABLE CUSHIONS

FIELD OF THE INVENTION

Inflatable cushions are well known for recreational purposes, such as camping and water sports, but such cushions are not stable except when fully inflated.

BACKGROUND OF THE INVENTION

Stabilized lifting devices, such as bellows and stacks of bags are known from our prior published Patents, but are expensive and are not cost effective where such levels of stability are not necessary in situations wherein the user needs lifting assistance in relatively stable circumstances, e.g. to rise from a seated position in an armchair to a position from which the user can attain a standing posture, during which lifting movement the user can hold onto the armrests on the armchair for stability.

SUMMARY OF THE INVENTION

The aforementioned cushions known for recreational purposes, cannot give enough lift when dimensioned to fit into an armchair, and superimposing two such cushions would destabilize the user as they were being inflated.

In order to avoid the problems of instability on the one hand and expense of full stabilization on the other; the present invention provides an inflatable lifting cushion comprising a plurality of inflatable segments including a first segment superimposed on a second segment, wherein each segment comprises a ring chamber around a central web, wherein the segments are bonded together at a junction between the ring chambers so that a central chamber is formed between the central webs; and wherein all said chambers are pneumatically interconnected and for inflation in unison via an inlet attached to the cushion.

The ring chambers may be of substantially rectangular form, or circular form, or may be of an angular form in which the corners are rounded. However, the substantially rectangular plan-form is preferred.

The invention further provides a method of making the lifting cushion, comprising superimposing four sheets of an impermeable inelastic, flexible radio-frequency weldable material upon one another with a weld preventing disc disposed centrally between the second and third sheets and rings of said weld preventing material between the first and second sheets and between the third and fourth sheets, and a larger ring of weld preventing material between the peripheral margins of the second and third sheets, prior to bonding said sheets together by radio-frequency welding.

The preferred weldable material is any inelastic fabric coated in P.V.C. or weldable polyurethane.

The preferred weld preventing material is polythene, P.E.T. or similar non-reacting material.

BRIEF DESCRIPTION OF THE DRAWING

Other objects of this invention will appear in the following description and appended claims, reference being made to the accompanying drawings forming a part of the specification wherein like reference characters designate corresponding parts in the several views.

FIG. 1 shows an embodiment of lifting cushion, fully inflated, in vertical cross-section;

FIG. 3 is a sheet lay-up diagrams for forming the cushion.

DETAILED DESCRIPTION

Figure 2:
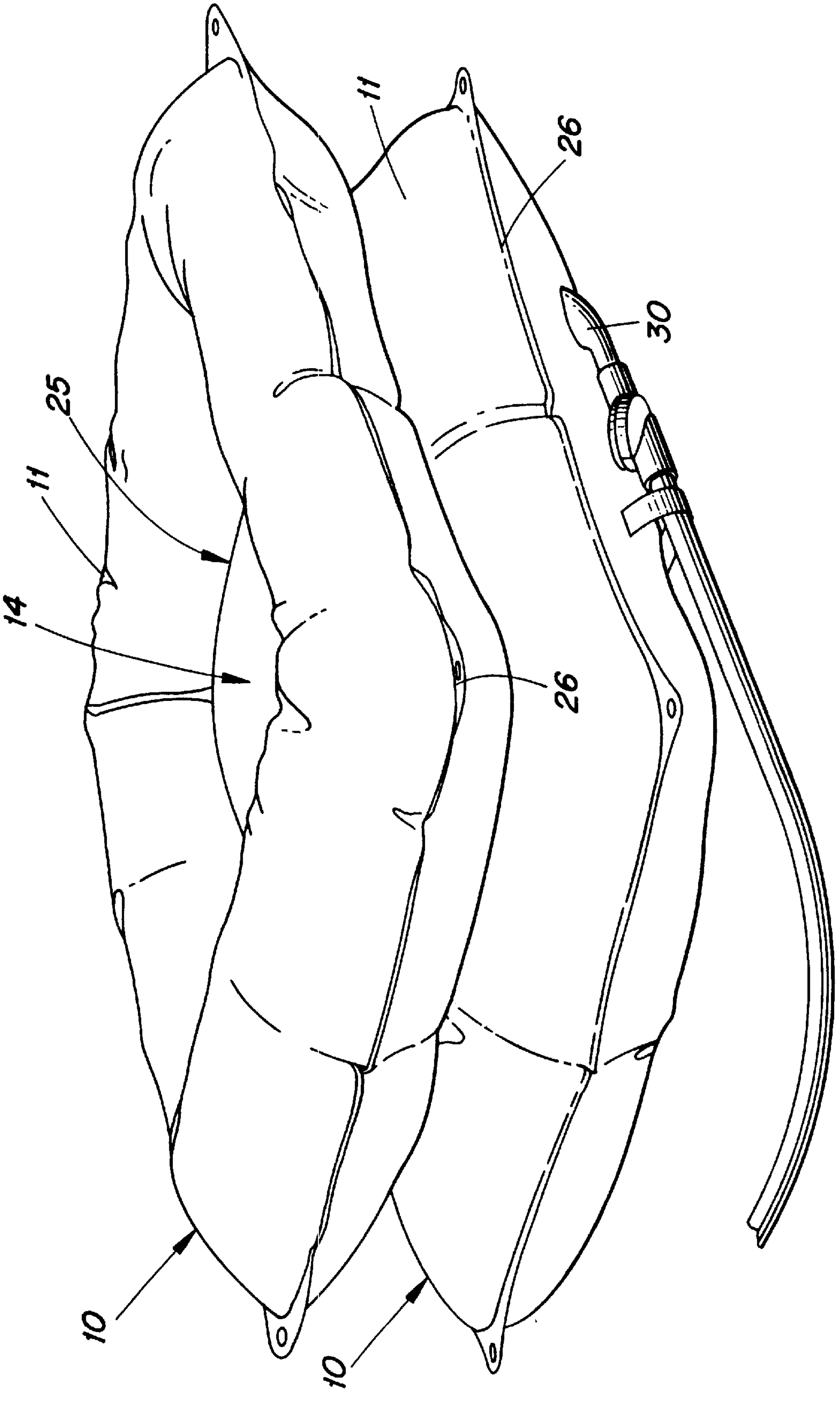
FIG. 2 shows a perspective view of the cushion.

The inflatable lifting cushion comprises two segments 10 each comprising a ring chamber 11 around a central web 12. The two segments 10 are welded together at a junction 13 to define therebetween a central chamber 14. An air inlet fitting 30 (FIG. 1) is attached to one of the segments 10 for simultaneous inflation of the chambers 11 and 14.

The cushion can be made in what is a simple and rapid process from four pre-cut sheets 15, 16, 17 and 18 of a flexible, inelastic and radio-frequency weldable material, by interposing weld preventing pre-cut members 19, 20 and 21 disposed between the sheets in the positions shown in FIG. 3 prior to making welds by welding electrodes indicated by reference numerals 22, 23 and 24 to form the junctions 13, 25 and 26 where the sheets are in direct contact without the members 19, 20 and 21 therebetween. FIGS. 1 and 3 are diagrammatic with the sheets and members shown vertically separated for clarity. In reality they are sandwiched together for welding. The members 19 and 20 remain in the finished cushion. The inlet 30 is bonded in before welding of the sheets. Ports 31 for pneumatic interconnection are pre-cut into the sheets 16 and 17 prior to welding.

The invention is not confined to details of the foregoing example and many variations are possible within the scope of the invention. For example, the arrangement allows for chamber 14 to inflate to a size just smaller than the combined height of two chambers. The cushion may comprise three or more segments. Suckers may be secured to the undersurface to hold the cushion in position on a support.

This gives a much more comfortable seat and increases the effective lifting area thereby requiring less pressure to lift a given weight. The slight depression in the middle helps keep the user centred.

The substantially rectangular plan of the device adds to the feeling of stability by limiting the movement of the fabric. A circular cushion would tend to spread a user's legs as it was inflated.

The invention also includes and provides a lifting cushion having any novel part, arrangement of parts or functional feature, and a method of construction having any novel step disclosed herein or in the accompanying drawings, and mechanical equivalents thereof.

We claim:

1. An inflatable lifting cushion comprising:

(a) plurality of inflatable segments including a first segment superimposed on a second segment, wherein each segment comprises a ring chamber (11) around a central web (12), (b) segments are bonded together at a junction between the ring chambers so that a central chamber (14) is formed between the central webs (12);

(c) all said chambers are pneumatically interconnected and (d) an inlet (30) is attached to the cushion for inflating said chambers in unison.

2. An inflatable lifting cushion as claimed in claim 1 wherein the segments (10) and webs are of an inelastic fabric coated in P.V.C. or weldable polyurethane.

3. A method of making a lifting cushion comprising:

superimposing four sheets (15,16,17,18) of an impermeable inelastic, flexible radio-frequency weldable material upon one another with a weld preventing disc composed of weld preventing material, (b) said disc being disposed centrally between the second and third sheets (c) a ring of a weld preventing material disposed between the first and second sheets and another ring of weld preventing material disposed between the third and fourth sheets, and (d) a larger ring of a weld preventing material disposed between the peripheral margins of the second and third sheets, and then (e)bonding said sheets together by radio-frequency welding.

4. A method as claimed in claim 3 wherein said weldable material is of any inelastic fabric coated in P.V.C. or weldable polyurethane.

5. A method as claimed in claim 3 wherein the weld preventing material is polythene or P.E.T..

6. An inflatable lifting cushion made by the method claimed in claim 3.

* * * * *